Patented Apr. 13, 1926.

1,580,144

UNITED STATES PATENT OFFICE.

DAVID A. LEGG AND CLARENCE W. HANCOCK, OF TERRE HAUTE, INDIANA, ASSIGNORS TO COMMERCIAL SOLVENTS CORPORATION, OF TERRE HAUTE, INDIANA, A CORPORATION OF MARYLAND.

MANUFACTURE OF BUTYRIC ACID.

No Drawing.   Application filed July 31, 1923. Serial No. 654,924.

*To all whom it may concern:*

Be it known that we, DAVID A. LEGG and CLARENCE W. HANCOCK, both subjects of the King of Great Britain and Ireland, and residents of the city of Terre Haute, in the county of Vigo and State of Indiana, have invented certain new and useful Improvements in the Manufacture of Butyric Acid, of which the following is a specification.

Our invention relates particularly to the recovery of pure butyric acid from certain mixtures more or less crude which contain a major portion of butyric acid, its salts or esters or a mixture thereof along with water insoluble compounds.

The chief aim of our invention is, among other things, to provide a novel simplified method of obtaining pure butyric acid which shall be colorless and completely miscible with water by utilizing such crude mixtures hereinbefore mentioned.

Such mixtures containing butyric acid along with other compounds may be formed by either of the following processes, viz.:

A. Crude butyric acid obtained by the oxidation of butyraldehyde, for example, according to the methods described in the Clarence W. Hancock application for patent filed in the United States Patent Office August 31, 1922, Serial No. 585,341; or B. Crude butyric acid obtained from the hydrolysis of butyl butyrate produced according to the methods described in the David A. Legg and Charles Bogin application for patent filed in the United States Patent Office June 16, 1923, Serial No. 645,756, such butyl butyrate having been produced by the condensation and subsequent fractional distillation of butyraldehyde.

We have discovered that the butyric acid produced by each of said methods cannot be rendered altogether colorless and completely miscible with water by simple distillations, and the essence of our invention consists in novel and improved methods for obtaining from such crude mixtures a substantially pure butyric acid which shall be both colorless and completely water soluble. Our novel methods of purification are in principle substantially identical for each of the aforesaid types of the crude products and will now be separately described.

A. Crude mixtures of the first type referred to consisting of approximately ninety per centum (90%) butyric acid are first neutralized with a strong solution of alkali metal hydroxide or other suitable alkali metal base, and then the alkali metal butyrate solution is drawn off from the insoluble impurities which separate and remain on the surface of the solution. This alkali metal butyrate is then boiled to drive off any traces of volatile impurities and thereafter cooled. In further carrying out our new methods of procedure, the cooled alkali metal butyrate is then mixed with an excess (for example 5%) of sulphuric or other suitable mineral acid in such concentration that the resultant mineral salt will saturate the solution and salt out the butyric acid.

The supernatant butyric acid is then decanted and distilled, the main fraction being collected between 155 and 165° C., and the other fractions are returned for subsequent treatment with fresh material. Thereafter in carrying out our improved methods, the fraction collected between 155 and 165° C. is distilled slowly in the presence of a small proportion (for example 1%) of concentrated sulphuric acid. The distillate obtained is then boiled under a reflux condenser for about 3 hours or until all odor of sulphuric dioxide is thoroughly dispelled. The resulting liquid may then be redistilled and the portion collected between 159 and 163° C. will be found to consist of colorless 98–100% pure butyric acid which is completely miscible with water.

As an example of the use of our improved methods according to the foregoing procedure, we ascertained that two liters of crude butyric acid obtained by air oxidation of butyraldehyde according to the process described in the said United States Hancock application for patent Serial No. 585,341, contained approximately 85% of butyric acid. Two and one-half (2½) liters of caustic soda solution containing 800 grams of NaOH were then added and the lower layer of sodium butyrate was drawn off while the solution was still hot. Such sodium butyrate solution was then boiled until practically free from odor, then made up with water to four (4) liters, cooled and then mixed with one (1) liter of cool sulphuric acid containing one thousand (1000) grams of concentrated $H_2SO_4$. The butyric acid separated on the surface of this solution, and the lower layer of concentrated sodium sulphate solution was withdrawn while hot. The salted butyric acid thus obtained amounting to 1980 cc. was then distilled through an ordinary fractionating column. The main fraction collected between 155 and 165° C. was of a pale yellow color and on mixing with water exhibited a slight turbidity. Such fraction was thereupon distilled with 1% of sulphuric acid, the distillate refluxed for about 3 hours to dispel the sulphur dioxide and finally redistilled, collecting the fraction between 159 and 163° C. This resulting product was colorless and completely miscible with water, and upon analysis was found to contain 98–100% pure butyric acid. Upon working up the intermediate fractions we finally obtained 1320 grams of colorless butyric acid completely soluble in water.

B. As an example of the use of our improved methods upon the crude mixtures obtained in the second type referred to by the hydrolysis according to the practice outlined for producing butyl butyrate by condensation of butyl aldehyde as described in the said United States Legg and Bogin application for patent Serial No. 645,756, the butyl butyrate was saponified in the ordinary way by means of an alcoholic alkali solution, and the dry solution of alkali metal butyrate treated as follows: In the aforesaid Legg and Bogin process of making butyraldehyde and butyl butyrate by passing vaporized butyl alcohol over a copper catalyst, a distillation residue was collected containing approximately sixty-five (65%) per centum of butyl butyrate. This residue was fractionated and a fraction collected between 150 and 170° C. which was of yellow color. Seventy-two (72) kilograms of this fraction were saponified by means of alcoholic sodium hydroxide solution. The alcohol was then distilled off, and after adding water the sodium butyrate was then concentrated in the usual manner to a specific gravity of 1.1 at 75° C. To this solution was added seventy (70 lbs.) pounds of 75% by weight sulphuric acid ($H_2SO_4$). From this the crude butyric acid separated out and was decanted and then fractionated. The portion collected between 155 and 165° C. was then distilled with 1% of concentrated sulphuric acid. Thereafter such distillate was boiled for about 3 hours under a reflux condenser to drive off the sulphur dioxide. A final distillation was then made and butyric acid collected between 159 and 163° C. Upon working up all the intermediate fractions in a similar manner we obtained twenty-six (26) kilograms of butyric acid boiling between 159 and 163° C. The product was colorless, completely miscible with water and contained 98.5% pure butyric acid.

In both examples which we have described, it will be noted that our improved method for the manufacture of pure butyric acid comprises acidifying the butyrate solutions in such concentrations that the resultant mixture shall contain a saturated solution of mineral salts which will thereby bring about the separation of the butyric acid, followed by distilling with concentrated sulphuric acid in order to produce the substantially pure butyric acid which is both colorless and completely miscible with water; further that concentrated solutions are maintained throughout.

While we have described our invention above in detail, it is also understood that the use of equivalents is contemplated, and that such details of our methods of manufacture may be variously modified without departing from the spirit of our invention or the scope of the appended claims.

We claim as our invention:

1. The method of manufacturing colorless and water-soluble butyric acid which comprises forming an alkali metal butyrate solution from crude butyric acid, adding a mineral acid in excess of the amount required to decompose the alkali metal butyrate, separating the butyric acid thereby produced, and finally distilling the butyric acid so produced in the presence of sulphuric acid.

2. The method of manufacturing colorless and water-soluble butyric acid which comprises forming an alkali metal butyrate solution from crude butyric acid, boiling said solution to remove volatile substances therefrom while concentrating same, adding a mineral acid in excess of the amount required to decompose the alkali metal butyrate, separating the butyric acid thereby produced, and finally distilling the butyric acid so produced in the presence of sulphuric acid.

3. The method of manufacturing colorless and water-soluble butyric acid which comprises forming an alkali metal butyrate solution from crude butyric acid, boiling said solution to remove volatile substances therefrom while concentrating same and thereafter cooling same, adding a mineral acid in excess of the amount required to decompose the alkali metal butyrate, separating the butyric acid thereby produced, and finally distilling the butyric acid so produced in the presence of sulphuric acid.

4. The method of manufacturing colorless and water-soluble butyric acid which comprises forming a sodium butyrate solution from crude butyric acid, adding a mineral acid in excess of the amount required to decompose the sodium butyrate, separating the butyric acid thereby produced, and finally distilling the butyric acid so produced in the presence of sulphuric acid.

5. The method of manufacturing colorless and water-soluble butyric acid which comprises forming a sodium butyrate solution from crude butyric acid, boiling said solution to remove volatile substances therefrom while concentrating same, adding a mineral acid in excess of the amount required to decompose the sodium metal butyrate, separating the butyric acid so produced in the presence of sulphuric acid.

6. The method of manufacturing colorless and water-soluble butyric acid which comprises forming a sodium butyrate solution from crude butyric acid, boiling said solution to remove volatile substances therefrom while concentrating same and thereafter cooling same, adding a mineral acid in excess of the amount required to decompose the sodium butyrate, separating the butyric acid thereby produced, and finally distilling the butyric acid so produced in the presence of sulphuric acid.

7. The method of manufacturing colorless and water-soluble butyric acid which comprises forming an alkali metal butyrate solution from crude butyric acid, then acidifying the alkali metal butyrate solution thus formed in such concentration that the resultant mixture contains a saturated solution of mineral salts, then separating from the mixture the butyric acid produced, and finally distilling the latter in the presence of concentrated sulphuric acid.

8. The method of manufacturing colorless and water-soluble butyric acid which comprises forming an alkali metal butyrate solution from crude butyric acid, then acidifying the alkali metal butyrate solution thus formed in such concentration that the resultant mixture contains a saturated solution of mineral salts, then separating from the mixture the butyric acid produced, then distilling the latter in the presence of sulphuric acid, boiling such distillate to remove the sulphur dioxide, and finally distilling the resultant product at a temperature between 159 and 163° C.

9. The method of manufacturing colorless and water-soluble butyric acid which comprises forming a sodium butyrate solution from crude butyric acid, then acidifying the sodium butyrate solution thus formed in such concentration that the resultant mixture contains a saturated solution of mineral salts, then separating from the mixture the butyric acid produced, and then distilling the latter in the presence of sulphuric acid.

10. The method of manufacturing colorless and water-soluble butyric acid of 98–100% strength, which comprises neutralizing crude butyric acid with a solution of alkali metal base, separating the alkali metal butyrate formed, adding to such solution an excess of mineral acid so concentrated as to form a solution approximately saturated with the alkali metal salt, separating therefrom the butyric acid thereby obtained, and finally distilling same in the presence of sulphuric acid.

11. The method of manufacturing colorless and water-soluble butyric acid of 98–100% strength, which comprises neutralizing crude butyric acid with a sodium hydroxide solution, separating the sodium butyrate formed, adding to such solution an excess of sulphuric acid so concentrated as to form a solution approximately saturated with sodium sulphate, separating therefrom the butyric acid thereby obtained, and finally distilling same in the presence of sulphuric acid.

12. In the method of manufacturing colorless and water-soluble butyric acid of 98–100% strength, the steps which comprise adding to an alkali metal butyrate solution formed from crude butyric acid an excess of sulphuric acid so concentrated as to form a solution saturated with the alkali metal salt, separating therefrom the butyric acid obtained, and distilling the latter in the presence of sulphuric acid.

DAVID A. LEGG.
CLARENCE W. HANCOCK.